March 23, 1948.　　　H. G. SPIER　　　2,438,134
FREE PISTON ENGINE
Filed April 17, 1946　　　2 Sheets-Sheet 1
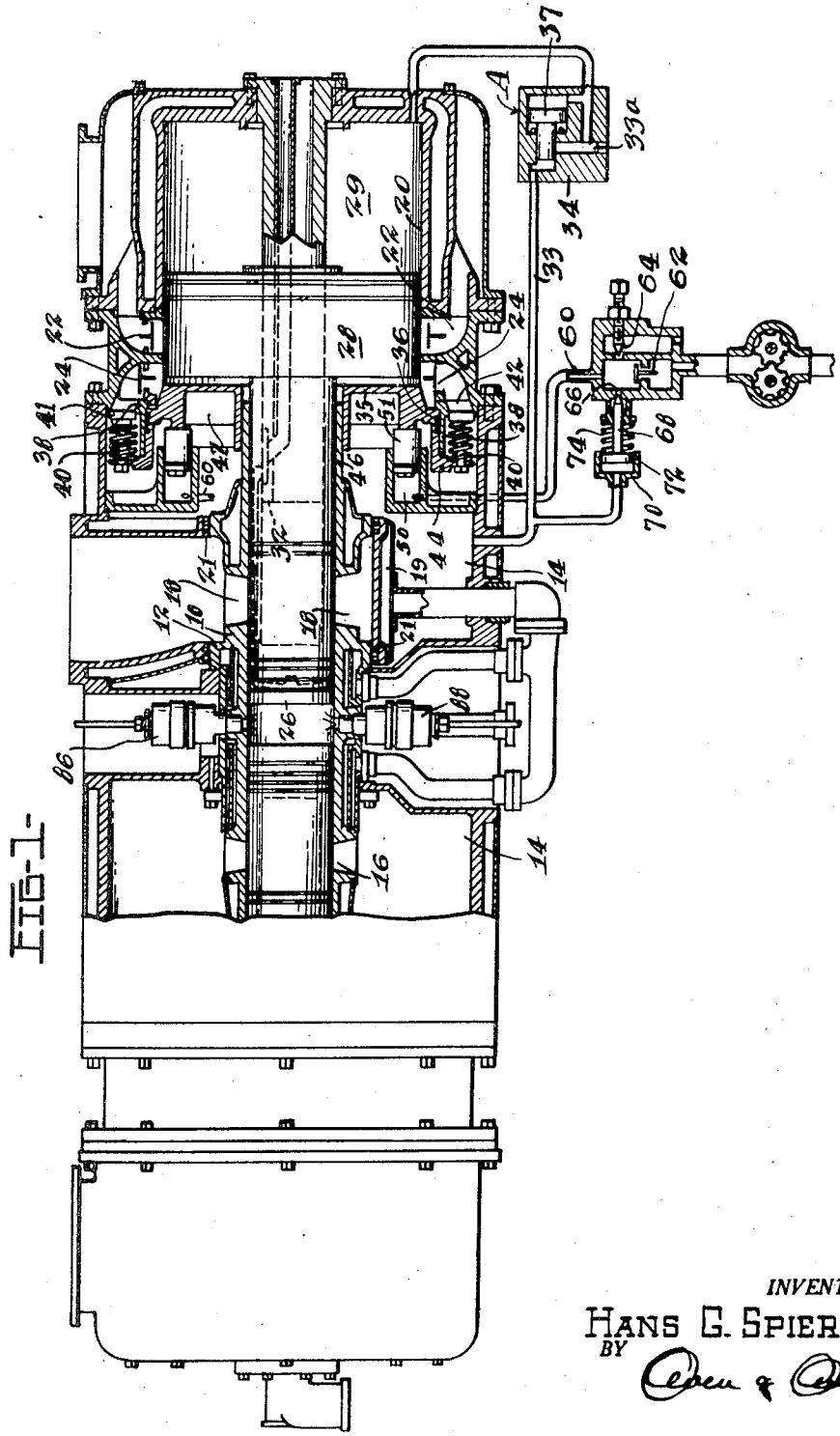
INVENTOR.
HANS G. SPIER
BY

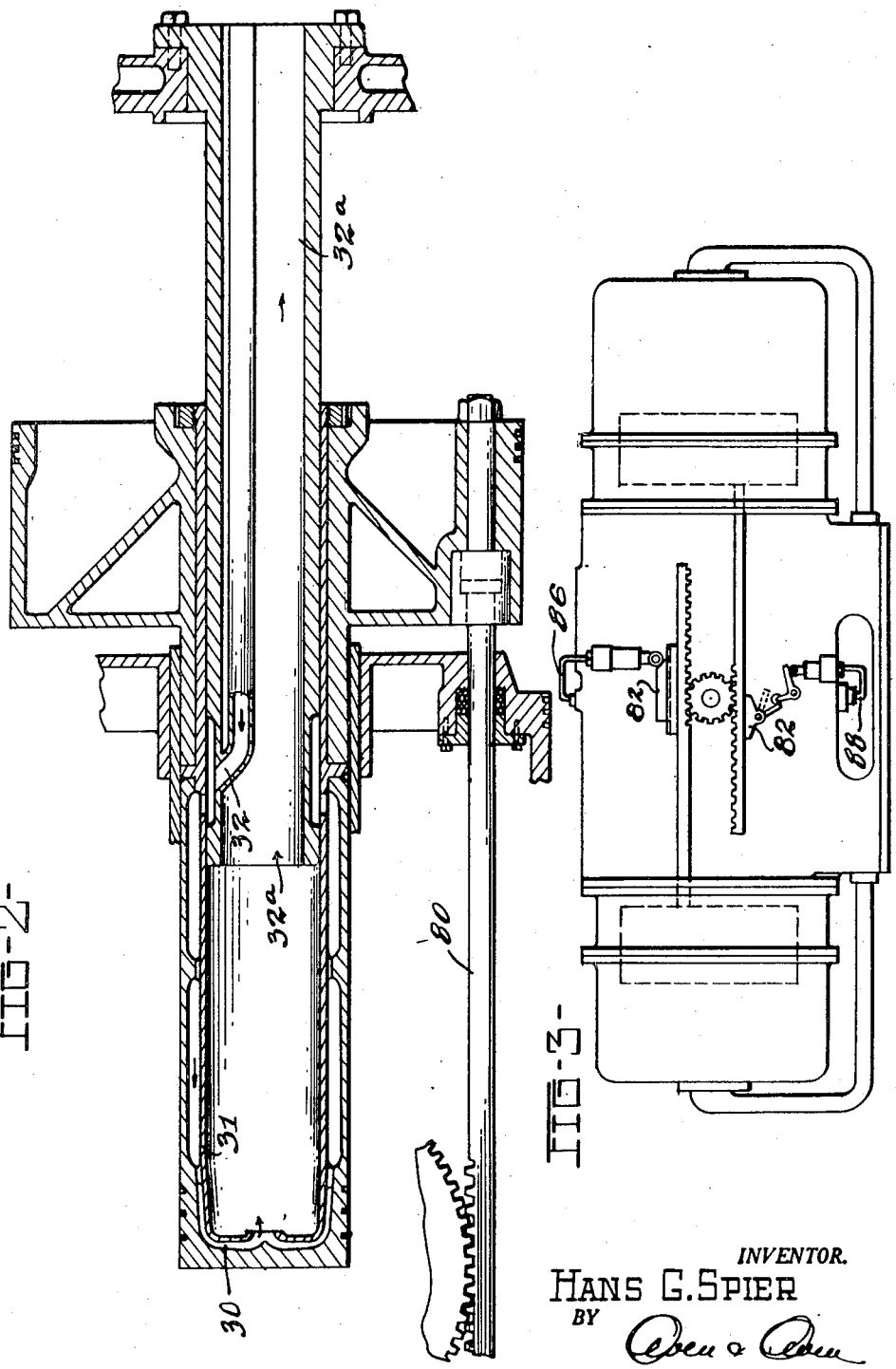

Patented Mar. 23, 1948

2,438,134

UNITED STATES PATENT OFFICE 2,438,134

FREE PISTON ENGINE

Hans George Spier, Hamilton, Ohio, assignor, by mesne assignments, to Lima-Hamilton Corporation, New York, N. Y., a corporation of Virginia Application April 17, 1946, Serial No. 662,883

12 Claims. (Cl. 123—46)

This invention relates to an internal combustion engine of the free piston type and is particularly directed to an engine having an increased range over which optimum operating efficiencies are obtainable.

In the known types of free piston engines the piston moves out on its combustion stroke to compress a charge of air, a portion of which is trapped and utilized to return the piston to the firing position. The untrapped portion of the compressed air may be used to supercharge the firing cylinder or it may be taken from the compressor cylinder to give up its energy in another machine. In either event a large portion of the energy available from the outward stroke of the piston is extracted during the outward stroke in the form of compressed gas.

One of the attributes of a free piston system is that the cyclic rate and the distance of piston travel vary through relatively narrow limits from idle to full load. Thus the pressure imparted to air in the compressor cylinder as well as the volume of compressed air can be varied through a relatively narrow range.

When a free piston engine is so constructed that substantially the entire volume of compressed air is subsequently utilized to scavenge and charge the firing cylinder it will be apparent that if sufficient air is present at the requisite scavenging pressure at full load, too much air will be present at no load or idling conditions so that the excess air must either pass through the cylinder without being burned or a scavenging air dump valve must be resorted to. In addition to this inherent disadvantage, there is the factor that the volumetric efficiency of the compressor cylinder increases as the unit slows down under idling conditions so that a greater proportion of the energy from the outward stroke of the piston is stored in the compressed air than is the case at high loads. These causes lead to the result that a free piston engine arranged in the usual manner to compress air for scavenging or other purposes on the outward stroke of the piston can be operated at its optimum efficiency only over a narrow range.

The primary object of the present invention is to provide a free piston engine in which the characteristics of the compressor portion of the system are varied in accordance with the load on the engine.

Another object of the invention is to provide a free piston engine in which the volumetric characteristics of the compressor portion of the system are varied in accordance with the load on the engine as reflected in the scavenging air pressure.

Still another object of the invention is to provide an improved organization of the parts in a free piston engine to eliminate exterior passages and to facilitate cooling of the engine parts.

Other objects and advantages of the invention will become apparent from the following specification, reference being had to the accompanying drawings in which:

Figure 1 is a diagrammatic side elevation, with parts in section and parts broken away, of an engine embodying the present invention; Figure 2 is a central vertical section of a piston and associated cooling conduits showing also the manner of attachment of synchronizing racks; and Figure 3 is a diagrammatic side elevation illustrating one manner in which sequential operation of a plurality of fuel pumps may be obtained.

Referring to the drawings, an engine embodying a preferred form of the present invention includes a working cylinder 10 supported near its center in a frame 12. The frame comprises not only a support for the working cylinder but is made to include a chamber 14 surrounding that cylinder and constituting a scavenging air receiver. Inlet ports 16 in the sides of the working cylinder, adjacent an end thereof, permit air to flow into the cylinder from the chamber 14 and exhaust ports 18 in the opposite end conduct the products of combustion out of the cylinder. If the engine is utilized as a power gas generator, substantially the entire energy output of the unit resides in the products of combustion which are taken from the working cylinder at an elevated temperature and pressure. The hot gases so generated may be used in either reciprocatory or rotary prime movers. Except for the porting of the working cylinder 10 the entire unit is substantially symmetrical about a central transverse plane so that the following description of one-half of the engine will suffice for the opposite half.

The exhaust ports 18 lead to an exhaust header 19 which is thus subject to considerable thermal distortion. The header 19 is made independent of the movement between itself and the working cylinder by sealing the contact between the two parts by simple piston rings 21. The rings are called upon to withstand only the differential between exhaust pressure and scavenging air pressure, a matter of a few pounds, so that leakage is minimized with only very few rings. Such a construction permits freedom of movement between the parts and eliminates the usual gasketed and bolted connection between the exhaust header and working cylinder liner.

At the end of the working cylinder 10, an enlarged compressor cylinder 20 is provided, having valved inlet ports 22 and discharge ports 24. The inlet ports communicate with the atmosphere through suitable filters or silencers (not shown) while the discharge ports 24 communicate directly with the scavenging air receiver 14.

A free piston 26 has a relatively small firing end disposed in the working cylinder 10 and has an enlarged compressor portion 28 working in the compressor cylinder 20. The compressor portion 28 of the free piston acts also as a bounce piston by compressing air between itself and the closed rear end of the compressor cylinder 20 on the outward stroke of the piston in a bounce chamber 29.

As shown in Figure 2, the free piston is made hollow and thus comprises a cooling chamber 30 at the firing end formed by the inner piston wall and by a web supported secondary wall 31. Coolant is thus passed against the inner surface of the piston from a stationary duct 32 the opening of which registers with the entrance to chamber 30 at each stroke of the piston. The heated coolant is discharged through a passage 32ª. Since both the inlet and discharge coolant passages are unimpeded and easily accessible from outside the engine frame, close regulation and easy governing of piston temperatures are provided.

On the outward stroke of the piston air is simply compressed in the bounce chamber 29 for the purpose of storing therein enough energy to carry out the forward piston stroke which must not only raise the temperature of the air in the working cylinder to the ignition temperature, but must also compress scavenging and charging air in cylinder 20. The proper pressure in the bounce chamber at the extreme inner position of the piston is quite low and may be maintained conveniently from the scavenging air chamber or receiver 14 by a passage 33 having a regulating valve 34 of conventional design intermediate its ends. A suitable regulating valve is shown in Figure 1 and may include a balanced piston 37 having one face subjected to the scavenging receiver pressure in pipe 33 and its opposite face subjected to the pressure in chamber 29. The ratio of the areas of the two piston faces is the same as the ratio of the respective chamber pressures so that passage 33ª in the regulating valve is opened or closed depending on the relative pressures on the two sides of the piston valve.

On the compression, or inward stroke of the free piston, air compressed in cylinder 20 ahead of the compressor piston is discharged through ports 24 and passages 42 to the scavenging air receiver 14, as above stated. The final, inner position of the compressor piston is one factor which determines the final pressure at which the air leaves the compressor cylinder as well as the volumetric efficiency of the compressor portion of the engine. If a large volume of compressed air is permitted to remain in the compressor cylinder at the instant when the piston reverses its direction and commences its next outward stroke, the compressor cycle has been less efficient than if substantially all of the air in the compressor chamber is discharged to the receiver 14. Further, the compressor efficiency is a function of the cyclic speed of the system since higher speeds mean increased friction at the ports and greater peak pressures in the air being compressed. Thus, if the unit is designed to give the proper air volume at the proper pressure at high speeds, it would normally deliver an excess at low speeds.

For this reason the end wall 35 defining the head of compressor cylinder 20 is made movable to increase or decrease the clearance volume remaining at the end of the compression stroke. The movable wall may be provided with a series of packing rings 36 and seated as a piston in association with a properly formed frame part 38. The wall is biased toward the center of the engine, in a direction to increase the clearance volume, by a series of springs 40 inserted between a stationary frame part 41 and a flange 44 extending from the movable wall part. At its center, the movable part surrounds a stationary member 46 which may be a rearward extension of the wall of, or a liner for, the working cylinder 10.

At its face opposite to the compressor cylinder, the movable wall 35 is in direct and open communication with the scavenging air receiver 14 through a space 47 so that the full scavenging air pressure tends to move the wall away from the center of the engine in a direction to decrease the compressor clearance volume and against the biasing pressure of springs 40. Thus the position of the wall part depends on the pressure balance between the air in the scavenging receiver, the adjusted force of springs 40, and the pressure in the compressor cylinders 20.

Since the pressure in the scavenging receiver varies and, of course, the pressure in the compressor cylinder passes rapidly from below atmospheric to a high positive pressure, means are provided to prevent the movable wall part from responding to each minute pressure fluctuation, but to confine its movements to follow only the average pressure in the scavenging receiver and to respond to an upward or downward trend in the average pressure in this space. The motion limiting means may comprise a series of hydraulic locking cylinders or dash pots 50 having pistons 51 in abutting engagement with a portion of the movable wall part.

The dash-pot cylinders 50 are connected by pipes 60 to a common source of oil under moderate pressure and each connection is provided with a check valve 62 opening in the direction of the cylinder. The check valve may be provided with a fixed bleed opening in the form of a small hole in the valve itself, or it may have an adjustable bleed by-pass 64. In any event, the system is such that cylinders 50 can fill rapidly but discharge slowly so that the movable wall part 35 cannot follow the individual cyclic pressure fluctuations in the scavenging receiver 14, but can follow only well defined, persistent trends of pressure variation, such as occur with a change in engine load.

In the event of a sudden loss of pressure in receiver 14 such as might occur following failure of one of the engine parts or connections or a very rapid change in load, means must be provided to permit the movable wall part 35 to recede quickly from the path of the compressor piston 28. As indicated in Figure 1 this safety device may conveniently take the form of a vent 66 normally closed by a valve 68 held to its seat by pressure in a cylinder 70 acting against piston 72 connected to the valve stem. A spring 74 urges the valve to vent opening position in the event of failure of the pressure in cylinder 70. The dash-pot cylinders 50 are not active immediately after starting, until the pressure in the scavenging receiver 14 builds up, so that this pressure may be used in the safety cylinder 70.

Each of the opposed free pistons is connected to a rack bar 80 and the racks cooperate with a synchronizing pinion in the usual manner. Each of the rack bars is provided with a fuel control means 82 which operate associated fuel pumps 84 to cause fuel to enter the working cylinder 10 from nozzles 86 and 88. One of the devices 82 may be a conventional cam which actuates its associated nozzle on the inward stroke of the pistons, while the other may be a dog arranged to operate its associated nozzle during the combustion stroke. A separate fuel pump is provided for each of the two nozzles and the operation of the two control means 82 is thus such that the nozzles inject successively and not simultaneously. The tips of nozzles 86 and 88 are so formed that the first nozzle to inject has a narrow, flat spray pattern while the pattern of the other nozzle is a wide angle cone. The operating fuel is thus introduced into the cylinder in such a form and at such times as to be most advantageously burned. The peak operating pressures can thus be reduced since the working pressure is longer sustained.

The operation of an engine embodying the features of the present invention differs from the operation of known free piston engines principally in the manner in which energy is returned to the cycle by the compressor piston. Once the engine is started the fuel controls may be operated by any suitable load responsive mechanism, and the extent of the outward stroke of the pistons maintained substantially constant by an overstroke fuel control device which is known in the art. The kinetic energy of the pistons is absorbed by the air in the bounce chamber and is immediately utilized to return the pistons to the inner position, none of the energy being extracted to compress scavenging air in the usual manner. As the pistons return toward the inner position, air is compressed ahead of the compressor pistons 28 and enters the scavenging air receiver 14 through the valved discharge ports 24 and passages 42. The compression chamber in which pistons 28 operate are defined by the cylinder walls and the movable end walls 35 so that the volume of the chambers is reduced or enlarged depending on the pressure in the scavenging air receiver 14. As previously noted each movable wall part 35 is biased in one direction by springs 40, in the opposite direction by the pressure in the scavenging air receiver 14, and checked in its movements by dash-pots 50—51.

In the working cylinder 10, the sequence of events is analogous to any two cycle compression ignition engine operating at charging and exhaust pressures higher than atmospheric. In the free piston engine, however, the cyclic rate increases at high loads, the stroke shortens somewhat, and the pressure in the scavenging air receiver rises to move wall 35 towards the end position of piston 28 so that a greater proportion of the air in the compressor cylinder is pumped by the compressor. As the load falls off the back pressure against the engine exhaust likewise falls off and the drop is reflected in the pressure in the scavenging air receiver. The dash pots 50-51 then permit the movable wall part 35 to assume a new position representing a larger clearance volume in the compressor cylinder. The variation in clearance volume from no load to full load operating positions can be expressed in terms of the compression ratio of the compressor and varies from about 7.3 to 1 at no load to 11 to 1 at full load.

The fuel control of the nozzles is under the influence of the device driven by the engine exhaust, more fuel being introduced, of course, as the load increases.

While the invention has been shown in conjunction with a specific form and disposition of the parts, it will be appreciated that various modifications and changes may be made without departing from the spirit of the invention as defined in the appended claims.

Having thus described my invention, what I claim as new, and desire to secure by United States Letters Patent, is:

1. In an internal combustion engine of the free piston type, a power cylinder, a compressor cylinder, pistons in said cylinders operating in timed relation to each other, a scavenging air receiver taking the discharge from said compressor cylinder and supplying said power cylinder, and means responsive to the pressure in said scavenging air receiver to vary the effective volume of said compressor cylinder.

2. In an internal combustion engine of the free piston type, a power cylinder, a compressor cylinder, pistons in said cylinders operating in timed relation to each other, means to vary the volume of said compressor cylinder, and mechanism to operate said last means in response to a pressure which varies with the power load on said power cylinder.

3. In an internal combustion engine of the free piston type, a power cylinder, a compressor cylinder, connected pistons in each of said cylinders, a scavenging air receiver taking the discharge from said compressor cylinder and supplying said power cylinder, a movable end wall defining one end of said compressor cylinder, and means to move said end wall in a direction tending to reduce the volume of said compressor cylinder as the pressure in said scavenging air receiver increases.

4. The combination defined in claim 3 and means biasing said movable end wall in a direction to increase the volume of said compressor cylinder.

5. The combination defined in claim 3, means biasing said movable end wall in a direction to increase the volume of said compressor cylinder, and damping means to retard the movement of said end wall whereby momentary fluctuations of pressure in said scavenging air receiver are not followed, but only persistent pressure trends are utilized to vary the volume of said compressor cylinder.

6. In an internal combustion engine of the free piston type, a power cylinder, a compressor cylinder, connected pistons in each of said cylinders, a scavenging air receiver taking the discharge from said compressor cylinder and supplying said power cylinder, a movable end wall defining one end of said compressor cylinder, one side of said end wall being exposed to the pressure in said scavenging air receiver and urged thereby in a direction tending to reduce the volume of said compressor cylinder, and means tending to lock said end wall in the position of greatest volume reduction.

7. In an internal combustion engine of the free piston type, a power cylinder, a compressor cylinder, connected pistons in each of said cylinders, a scavenging air receiver taking the discharge from said compressor cylinder and supplying said power cylinder, a movable end wall defining one end of said compressor cylinder, one side of said end wall being exposed to the pressure in said scavenging air receiver and urged thereby in a direction tending to reduce the volume of said compressor cylinder, means to bias said one end wall in a direction tending to increase the volume of said compressor cylinder, and hydraulic dashpot means tending to lock said end wall in the position of greatest volume reduction and operative to permit a volume increase only in response to a sustained reduction in pressure in said scavenging air receiver.

8. In an internal combustion engine of the free piston type, a power cylinder, a compressor cylinder disposed as a concentric extension of said power cylinder, connected pistons in each of said cylinders, means forming a scavenging air receiver as a space surrounding said power cylinder receiving the discharge from said compressor cylinder and supplying said power cylinder, said compressor cylinder having an end wall portion exposed to the pressure in said scavenging air receiver and urged thereby during a compressor intake stroke, in a direction tending to reduce the volume of said compressor cylinder, hydraulic locking means to retain said end wall in the position of greatest volume reduction, and means to release said locking means as the pressure in said scavenging air receiver is reduced.

9. In an internal combustion engine of the free piston type, a power cylinder, a compressor cylinder disposed as a concentric extension of said power cylinder, connected pistons in each of said cylinders, means forming a scavenging air receiver as a space surrounding said power cylinder receiving the discharge from said compressor cylinder, piston controlled intake ports in said power cylinder through which charging air passes from said receiver to said power cylinder, a plurality of piston controlled exhaust ports from which products of combustion pass from said power cylinder, an exhaust header connecting all of said exhaust ports, and a floating pressure packing between said exhaust header and said power cylinder whereby said header and said cylinder undergo independent thermal expansions.

10. In an internal combustion engine of the free piston type, a power cylinder, a compressor cylinder disposed as a concentric extension of said power cylinder, connected pistons in each of said cylinders, means forming a scavenging air receiver as a space surrounding said power cylinder receiving the discharge from said compressor cylinder and supplying said power cylinder, a movable end wall defining one end of said compressor cylinder and working as a piston adjacent the side wall of said cylinder, said movable end wall part having a center opening through which said power piston reciprocates, and a conduit carried concentrically by a fixed end of said compressor cylinder and extending through said compressor cylinder and said compressor piston and terminating within said power piston, said conduit having inlet and discharge piston coolant passages whereby the temperature of said power piston is controlled.

11. In an internal combustion engine of the free piston type, a power cylinder, a compressor cylinder, connected pistons in each of said cylinders, means to vary the effective volume of said compressor cylinder in response to variation of a pressure which varies with the power load on said power cylinder, fuel injection devices adapted to inject fuel into opposite sides of said power cylinder at the center thereof, and means operated by said pistons to operate said injection device successively.

12. An internal combustion engine as set forth in claim 11 in which said fuel injection devices have different spray patterns, the first to inject having a penetrating narrow spray cone, and the second to inject having a widely diffused, less penetrating spray form.

HANS GEORGE SPIER.

REFERENCES CITED

The following references are of record in the file of this patent:

UNITED STATES PATENTS

| Number | Name | Date |
| --- | --- | --- |
| 2,274,683 | Fraser | Mar. 3, 1942 |

FOREIGN PATENTS

| Number | Country | Date |
| --- | --- | --- |
| 498,900 | England | 1939 |
| 470,806 | England | 1937 |

Certificate of Correction

Patent No. 2,438,134.

March 23, 1948.

HANS GEORGE SPIER

It is hereby certified that error appears in the printed specification of the above numbered patent requiring correction as follows: Column 7, line 8, strike out the word "one"; and that the said Letters Patent should be read with this correction therein that the same may conform to the record of the case in the Patent Office.

Signed and sealed this 11th day of May, A. D. 1948.

[SEAL]

THOMAS F. MURPHY,
*Assistant Commissioner of Patents.*